(12) United States Patent
Bailey et al.

(10) Patent No.: US 8,432,056 B2
(45) Date of Patent: Apr. 30, 2013

(54) SHROUDED VERTICAL AXIS DUAL-TURBINE GENERATOR

(76) Inventors: Laura J. Bailey, Denver, CO (US); John T. Bailey, Denver, CO (US)

(*) Notice: Subject to any disclaimer, the term of this patent is extended or adjusted under 35 U.S.C. 154(b) by 601 days.

(21) Appl. No.: 12/449,842

(22) PCT Filed: Feb. 29, 2008

(86) PCT No.: PCT/US2008/004269
§ 371 (c)(1),
(2), (4) Date: Aug. 28, 2009

(87) PCT Pub. No.: WO2008/109186
PCT Pub. Date: Sep. 12, 2008

(65) Prior Publication Data
US 2010/0213720 A1 Aug. 26, 2010

Related U.S. Application Data

(60) Provisional application No. 60/904,411, filed on Mar. 2, 2007.

(51) Int. Cl.
*F03B 13/00* (2006.01)
*H02P 9/04* (2006.01)
*F03D 9/00* (2006.01)
*F03B 13/10* (2006.01)

(52) U.S. Cl.
USPC .................................. 290/54; 290/43; 290/55

(58) Field of Classification Search .................... 290/43, 290/54, 55
See application file for complete search history.

(56) References Cited

U.S. PATENT DOCUMENTS

| | | | | | |
|---|---|---|---|---|---|
| 326,718 | A | * | 9/1885 | Oollins | 415/61 |
| 419,345 | A | * | 1/1890 | Otto | 415/4.2 |
| 2,335,817 | A | * | 11/1943 | Topalov | 415/4.4 |
| 2,379,324 | A | * | 6/1945 | Topalov | 415/4.2 |
| 3,928,771 | A | * | 12/1975 | Straumsnes | 290/43 |
| 4,088,419 | A | * | 5/1978 | Hope et al. | 415/4.4 |
| 4,156,580 | A | * | 5/1979 | Pohl | 415/4.2 |
| 4,174,923 | A | * | 11/1979 | Williamson | 415/211.1 |
| 4,582,013 | A | * | 4/1986 | Holland, Jr. | 114/39.3 |
| 4,764,683 | A | * | 8/1988 | Coombes | 290/55 |
| 4,960,363 | A | * | 10/1990 | Bergstein | 415/3.1 |
| 5,850,108 | A | * | 12/1998 | Bernard | 290/54 |
| 5,969,430 | A | * | 10/1999 | Forrey | 290/54 |
| 5,982,046 | A | * | 11/1999 | Minh | 290/55 |
| 6,674,181 | B2 | * | 1/2004 | Harbison | 290/55 |
| 6,808,366 | B2 | * | 10/2004 | Sikes | 416/1 |
| 6,942,454 | B2 | * | 9/2005 | Ohlmann | 416/11 |
| 8,057,159 | B2 | * | 11/2011 | Chong | 415/4.2 |
| 8,083,438 | B2 | * | 12/2011 | Bailey et al. | 405/195.1 |
| 2010/0213271 | A1 | * | 8/2010 | Bailey et al. | 239/14.1 |
| 2012/0111994 | A1 | * | 5/2012 | Kummer et al. | 244/15 |
| 2012/0187698 | A1 | * | 7/2012 | Bassett | 290/55 |

* cited by examiner

*Primary Examiner* — Pedro J Cuevas
(74) *Attorney, Agent, or Firm* — R. Ruschena Patent Agent, LLC

(57) ABSTRACT

The shrouded vertical axis dual-turbine generator is a system comprising a structure in the shape of a double airplane wings symmetrical foil, having a vertical axis turbine set into each camber at each side of the foil. The aerodynamic shape of the leading edge of the foil increases the speed of the water or air current incoming toward the generator. The trailing edge of the foil creates a slip stream which reduces turbulence. Movable shutters on each side of the foil structure control the amount of current to the turbines and sheltering them from storm and debris. The turbines have a modular design and can be made of a stacked number of blades.

9 Claims, 4 Drawing Sheets

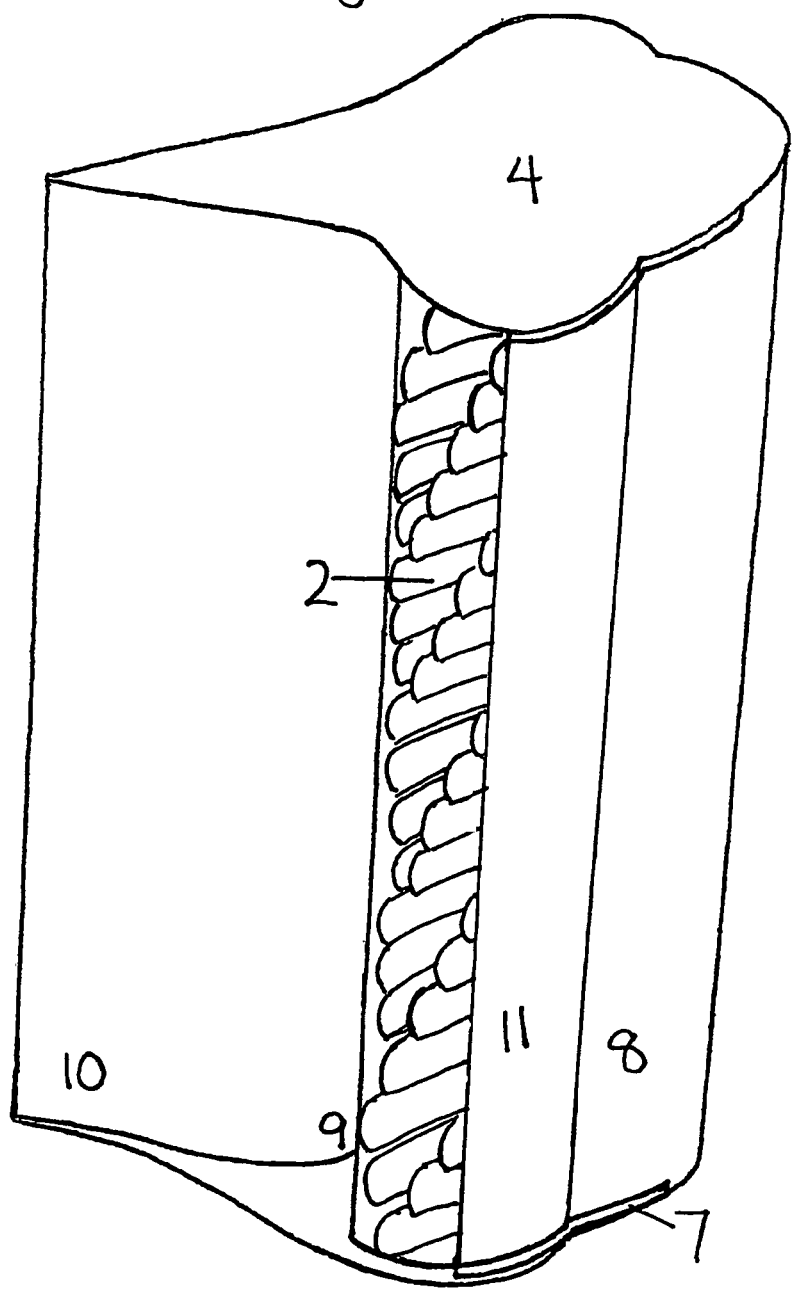

SHROUDED VERTICAL AXIS DUAL-TURBINE GENERATOR

RELATED APPLICATIONS

This application claims benefit of Provisional application No. 60/904,411 filed on Mar. 2, 2007.

BACKGROUND OF THE INVENTION

1. Field of the Invention

This invention relates to wind turbines, and in particular wind turbines having a vertical axis and a variable number of stackable blades.

2. Brief Description of the Prior Art

Alternative energy sources are greatly needed as the world reaches peak oil. Coal is still plentiful, and would last possibly for centuries, but the pollution and environmental destruction caused by the coal industry is unsustainable. Wind energy is one great source of renewable energy. The majority of wind energy is produced with extremely large horizontal axis turbines. One of the problems with these turbines is the turbulence created by these large blades. As a result of this turbulence, these turbines must be spaced three to ten times their diameter apart (side to side) and in rows five to ten times their diameter apart, which, for a 300 foot diameter turbine, would be up to 3,000 feet apart (side to side) and the rows of turbines up to 3,000 feet apart as well. This creates a very inefficient use of the available land.

Many patents have been issued to inventions related vertical axis turbines but none of these inventions are disclosing the use of two counter-rotating turbines incased into two cambers at the sides of an aero-dynamical foil shaped as two joined airplane wings. The foil also functions as a rudder to position the system against the direction of the blowing wind.

This positioning of the turbines inside this specially-shaped foil generates much less turbulence than all other reference turbines, greatly increasing potential output and allowing the electric generators to be more closely spaced. The widespread use of the shrouded vertical axis dual-turbine Generator as disclosed will greatly increase the amount of energy produced from wind. The Shrouded vertical axis dual-turbine generator can also be used submerged in water as a high output source of energy, having a low profile, without negatively affect tourist coastal areas.

U.S. Pat. No. 5,580,108 of inventor Bernard discloses a dual turbine system that attempts to takes advantage of the Bernoulli's principle, to increase energy output by splitting the flow around a leading edge to power turbines on each side. Bernard sought to increase output with the use of a foil, adjusting the flow of air over the turbines by moving the turbines in and out the flow to expose them to more or less flow, thus adjusting their speed.

U.S. Pat. No. 6,942,454 of inventor Ohlmann discloses a dual turbine system that splits the flow around a leading edge to the turbines on each side, and regulates the amount of flow using two movable deflector flaps. In the present invention, instead, the speed of the turbines is regulated by opening and closing two shutters on the sides of the foil.

SUMMARY OF THE INVENTION

The shrouded vertical axis dual-turbine generator is a generator of electricity or power to be used in air flow or submerged in a water flow. The shrouded vertical axis turbine is composed of a variable height structure in the shape of a vertical, symmetrical foil shaped as two joined airplane wings. The vertical axis turbines are set into the two specially-shaped cambers at both sides of the foil. The shape of the foil, as two joined airplane wings, takes advantage of Bernoulli's principle, to increase the speed of the air or water current that flows toward the turbines. The trailing end of the foil creates a slip stream to eliminate energy-robbing turbulence which would adversely affect the efficiency of the turbines, and also reducing turbulence between generators, when multiple generators are placed together, to increase the efficient use of areas available for energy production.

The two fixed, symmetric cambers, are designed in such a way that the space between the foil and the turbine is narrower toward the front and wider toward the rear of the camber. The wider space to the rear creates a high pressure area and the narrower space toward the front creates a low pressure area. This difference in pressure of these two areas generates an additional vacuum that increases the speed of the turbines.

As one of the major problem affecting wind turbines being the uncontrolled speed of the rotors causing the burning and destruction of the ball-bearings of the turning axe's, the speed of the turbines is controlled by shutters that slide in tracks. The shutters slide forward to expose the sides of the blades of the turbines not already sheltered by the camber.

The space between the turbine rotors and the shutters is a low pressure zone which contributes to increase the speed of the blades around into the current. In high speed currents, the shutters can slide back to isolate the turbines from the current.

The design of the turbines takes advantage of the increased low pressure zone, still allowing the turbines to turn when other turbines would be shut down. The shutters can also slide backward to shelter the blades of the turbines from the wind or water current for a controlled shut down or to shelter them from unusually strong winds or current during storms, thus preventing flying debris from damaging the rotors.

Because each turbine is made of multiple blades that are staggered in a spiral pattern, pressure lock at start up is eliminated while the back pressure at cruising speed is reduced. The space between the tips of the blades reduces drag at full speed by reducing back pressure.

The novel design of the shrouded vertical axis dual-turbine generator is aimed to the building a compact generator that can be utilized in situations where multiple generators are needed in the same close area, achieving a reduced turbulence between generators, in order to better utilize areas available for energy production and make a generator that works in very low to very high current speeds using either wind or water.

BRIEF DESCRIPTION OF THE DRAWINGS

FIG. 4 is an isometric perspective view of the shrouded vertical axis dual-turbine generator assembly.

DETAILED DESCRIPTION OF THE INVENTION

Figure 1:
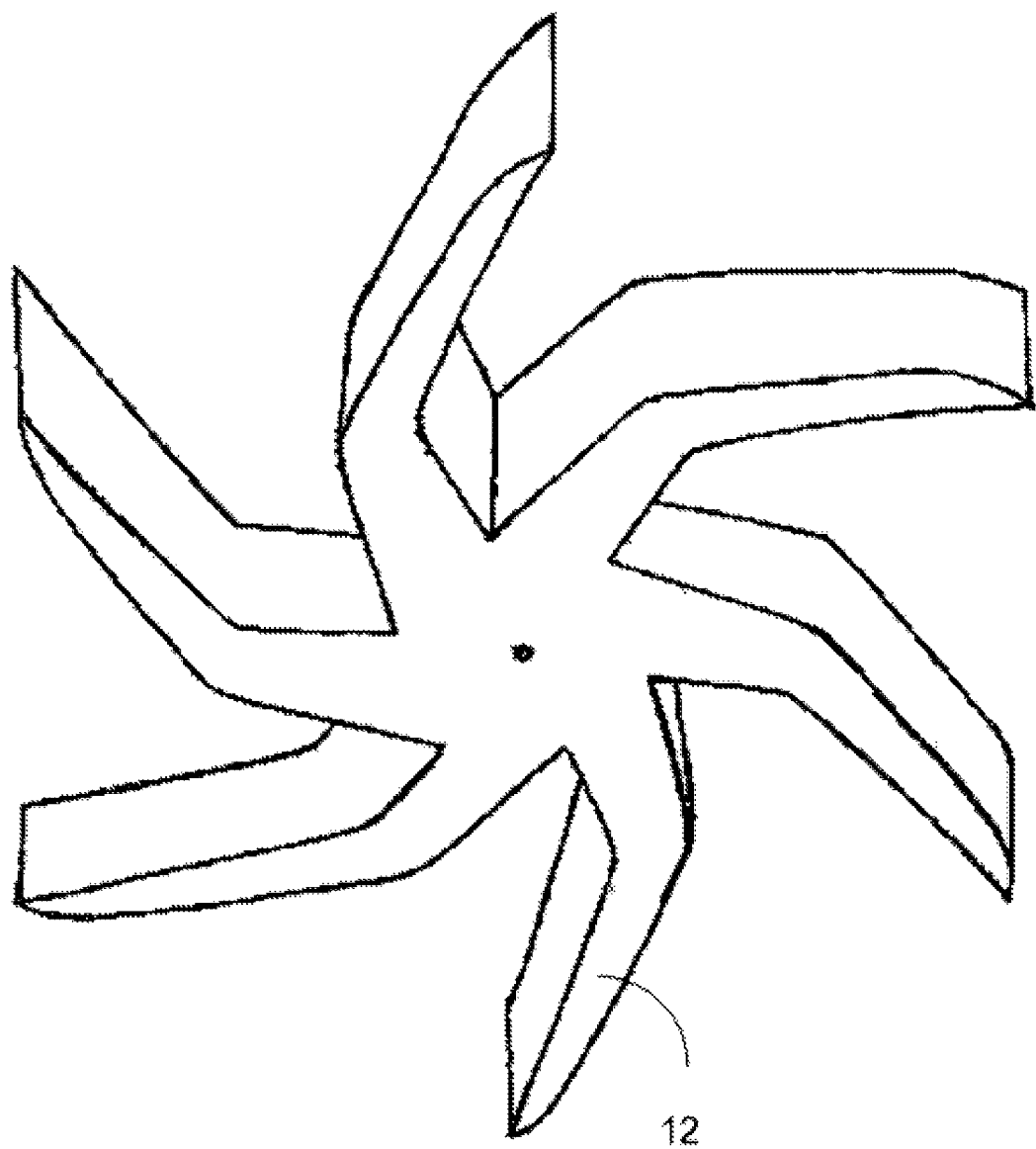
FIG. 1 is an isometric perspective view of a single blade of the turbine's rotor.

FIG. 1 illustrates a single blade 1 of the turbine's rotor with six lobes, although the number of lobes can vary between three and six to achieve optimum efficiency. The second half of each lobe is at a different angle than the first half of the lobe 12, while the tip of each lobe is at a steeper angle than the second half of the lobe 12.

Figure 2:
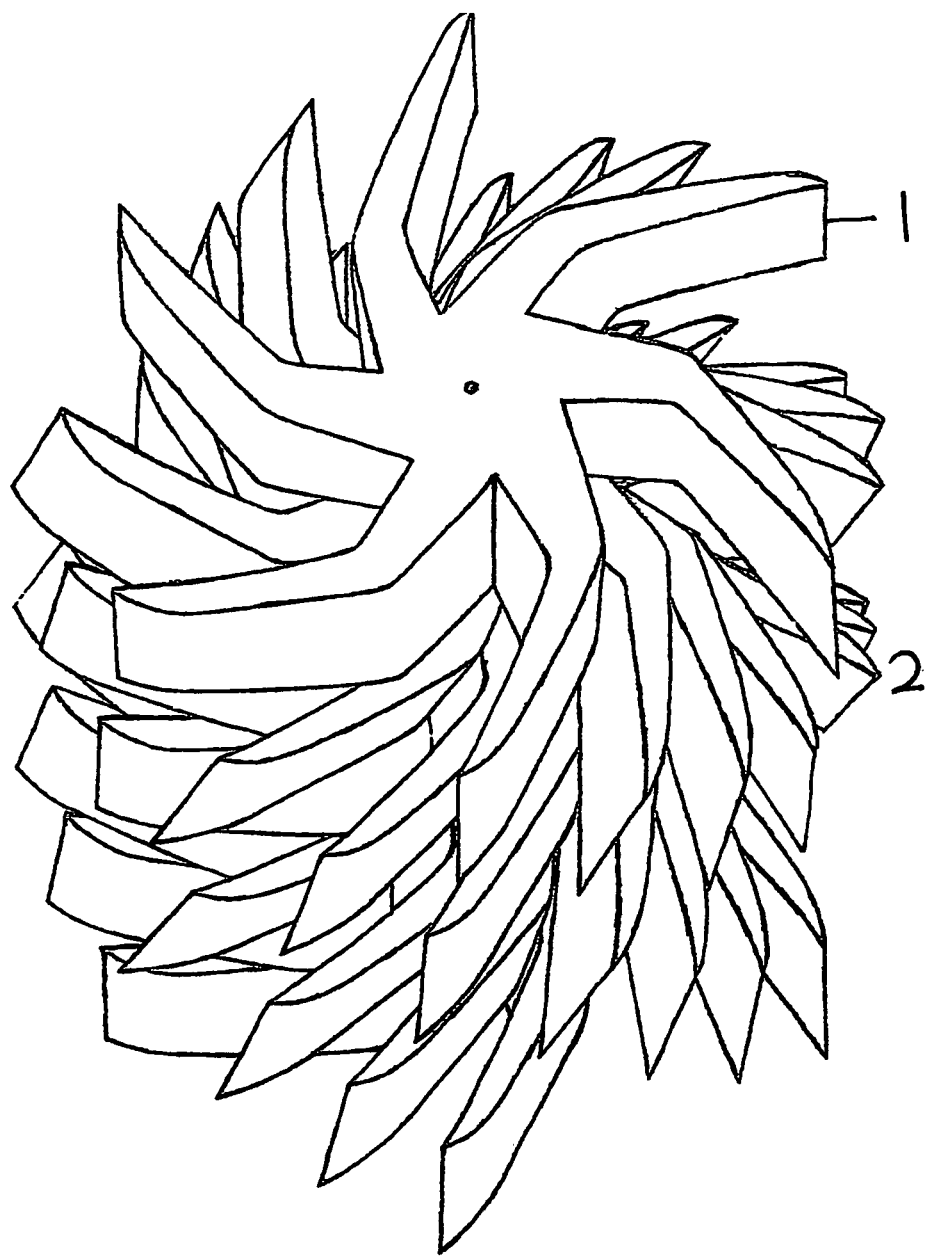
FIG. 2 is an isometric perspective view of multiple blades of the turbine's rotor staggered in a spiral pattern to make a vertical axis turbine.

The turbines of the shrouded vertical axis dual-turbine generators are of a modular design, comprised of multiple blades. The number of blades can be staggered in a spiral pattern to form a tower, according to FIG. 2, to facilitate the start up of the turbines 2 reducing the back pressure at cruising speed. The staggering of the blades 1 creates a space between the tips of the blades reducing the amount of energy needed for starting up the rotation of the turbine 2 and reducing drag at full speed by reducing back pressure.

Each blade comprises a plurality of lobes, where each second part of a lobe is at a different angle than the first half of each lobe, while the tip of each lobe is at a steeper angle than the second half of each lobe.

Figure 3:
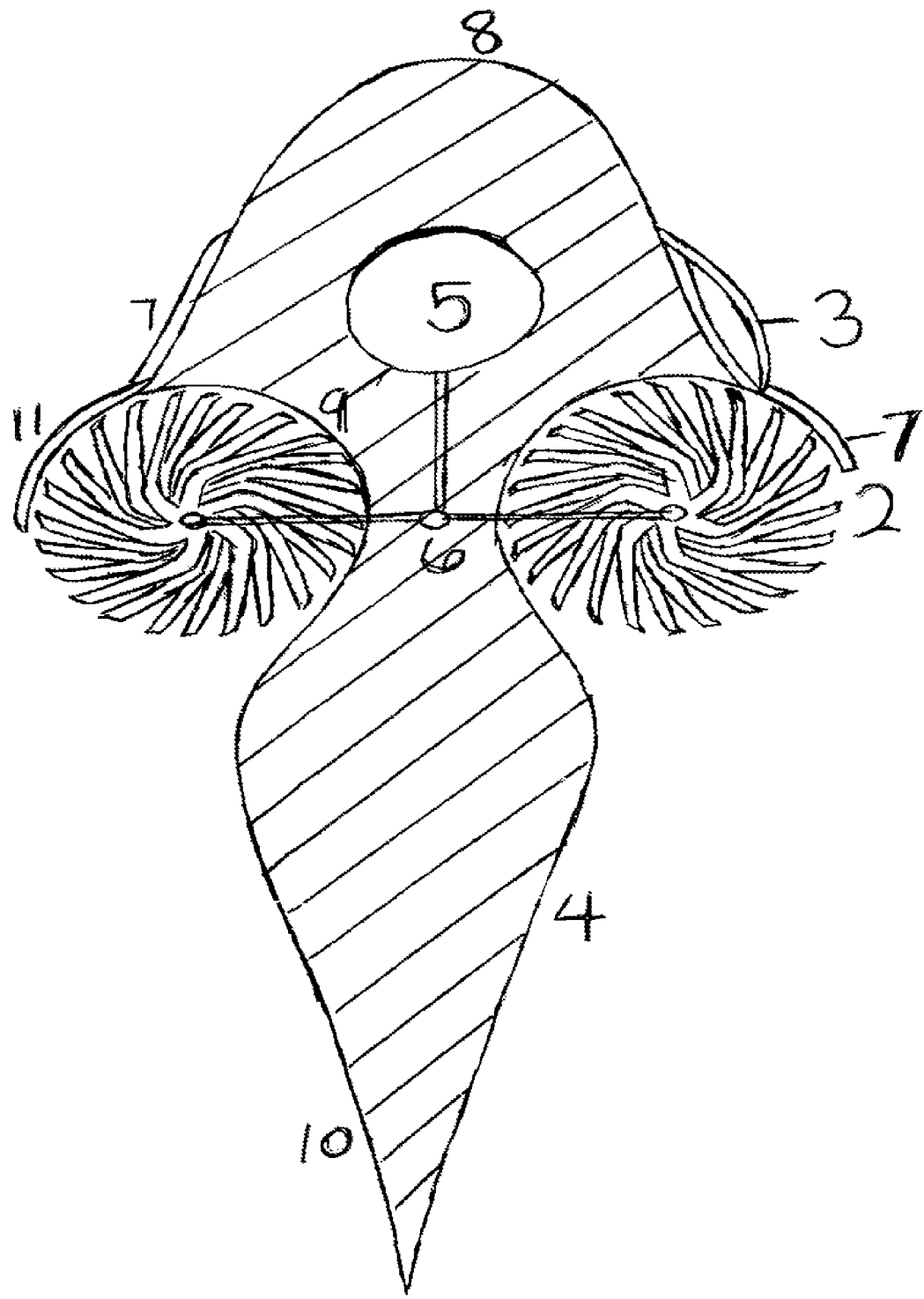
FIG. 3 is a cross section view of the shrouded vertical axis dual-turbine generator.

FIG. 3 is a cross section view of the shrouded vertical axis dual-turbine generator foil structure 4 to show the novel shape of the foil, which supports the entire stack of blades for both turbines. The novel shape of the foil has a rigid structure, having the aerodynamic shape of two airplane wings joined together at their bottom sides, resulting in a leading edge 8 directed toward the incoming wind or current, generates the high pressure area. The incoming wind or current is split into two flows each compressed by the hump of the foil increasing their speed as they are tangent to the two turbines 2 causing their rotation. The two flows are then tangent to the trailing edge 10 of the foil 4, which extends past the turbines, loosing pressure and speed. The two turbines made up of multiple blades 1 staggered at different angles, are mounted on an axle into the camber 9, at each side of the foil. The trailing edge 10 and the cambers 9 on both sides are used to control turbulence and, at the same time, to create a negative pressure.

The shape of the cambers 9 is such that the distance between the turbine edges of the blades and the camber wall is smaller in the area toward the leading edge of the camber and toward the center of the foil, characterized by a low pressure area, but is larger toward the trailing edge of the foil. This larger distance between the side of the turbine and the foil toward the trailing edge, creates a high pressure area at the rear of each turbine, contributing to increase speed and thus the efficiency of each turbine. The trailing edge of the foil has the dual purpose of helping to create a slipstream to reduce turbulence and to act as a rudder to steer the system toward the incoming wind or current.

The double wing shape of the foil and the shape of the cambers 9 enable to reduce the turbines turbulence to allow multiple generators to be placed close together, with more efficient use of land or water areas available for power generation. The reduced turbulence would allow generators to be positioned and linked in line to reduce the cost of underwater grid connections and moorings.

The shrouded vertical axis dual-turbine generator consists of a vertical structure in the shape of a symmetrical foil 4 with two cambers 9 on each side partially sheltering the two vertical axis turbines. The design of the foil is realized to takes advantage of Bernoulli's principle by splitting the current of either water or air, increasing its pressure and increasing its velocity.

The speed of the turbines of the shrouded vertical axis dual-turbine generators is controlled by shutters 3, 11, mounted on shutter tracks 7 that slide back and forth to expose the turbines 2 to more or less flow of the current. The shutters 3, 11 are held in tracks along the leading edges of the foil and continue along each side of the foil, changing the exposure of the turbines 2 to the incoming flow of air or water. A flow meter measures the speed of the current. Another measuring device measures the speed of the turbines to determine the desired or optimum position of the shutters 3, 11. The shutters 3, 11 can close fully, to the point that the turbines are totally sheltered by the current of air or water but may still operate somewhat due to the draw created by the low pressure zone which is between the turbine blades and the part of the camber part toward the leading edge and the center of the foil. This enables the shrouded vertical axis dual-turbine generator to operate also during gale force winds and in storm conditions, without damaging the rotor ball bearings. The shutters also protect the turbines blades from potential damage by debris in the air or water during stormy conditions.

FIG. 4 is an isometric perspective view of the shrouded vertical axis dual-turbine generator assembly showing the shrouded turbines into their cambers, the double-wing shape of the foil's leading edge 8 and trailing edge 10 and the closed shutters 11.

REFERENCE NUMERALS IN DRAWINGS

1. Blade
2. Turbine
3. Open Shutter
4. Foil
5. Generator
6. Drive Connection
7. Shutter Track
8. Leading Edge
9. Camber
10. Trailing Edge
11. Closed Shutter
12. Blade Lobe The embodiment described above is provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

We claim:
1. A shrouded vertical axis dual-turbine generator that operates when exposed to either a wind current or water current, comprising:
   a vertical structure in the shape of a symmetrical foil having two fixed cambers to house two turbines, one on each side of the foil;
   two vertical axis turbines that are mounted into two cambers of each side of the foil and are mechanically connected to one or multiple generators of electricity or to one or multiple pumps; and wherein the two cambers are concave and specifically shaped to leave more space between the turbine's blades tip and the wall on the rearward side of the camber, to create a high pressure zone, while leaving less space between the turbine's blades tip and the area of the camber at the forward side of the camber to create a low pressure area; said low and high pressure areas increase the turbine's efficiency by augmenting its rotating speed; and
   movable shutters capable of sliding inside guiding tracks to control the rotating speed of the turbines by increasing or decreasing the amount of air or water that flows over the turbines; said shutters are operated by an actuator connected to a flow meter that measures the speed of the wind or water current.
2. A shrouded vertical axis dual-turbine generator according to claim 1, wherein the foil housing the two cambers has the aerodynamic shape equal to the shapes of two foils joined together at their less curved surfaces; said foil having:

a leading edge oriented toward the incoming flow of air or water splitting the flow of air or water into two flows, each increasing its speed and pressure flowing toward the turbines, which are mounted inside the cambers on each side of the foil;

a trailing edge at the opposite side of the leading edge, said trailing edge creates a slip stream to eliminate energy-robbing turbulence and functions as a rudder or a wind vane to operate an actuator that assists the orientation and pivoting of the generator around its axle to have its leading edge toward the incoming flow of air or water.

3. A shrouded vertical axis dual-turbine generator, according to claim 1, wherein the two cambers on each side of the foil are partially shrouding the turbines while not affecting the speed of the current of air or water flowing over the turbines.

4. A shrouded vertical axis dual-turbine generator, according to claim 1, wherein the cambers at each side of the foil are of fixed shape.

5. A shrouded vertical axis dual-turbine generator, according to claim 1, wherein the turbines are of modular design, made of a plurality of blades stacked on each other on its axis.

6. A shrouded vertical axis dual-turbine generator, according to claim 5, wherein the modular design of the turbines provides a space between the tips of the blades to reduce drag by reducing back pressure.

7. A shrouded vertical axis dual-turbine generator, according to claim 5, wherein each blade comprises a plurality of lobes, each second part of a lobe is at a different angle than the first half of each lobe, while the tip of each lobe is at a steeper angle than the second half of each lobe.

8. A shrouded vertical axis dual-turbine generator, according to claim 1, wherein the shutters slide forward, guided by tracks, to further expose the portion of the turbines which is not sheltered by the cambers.

9. A shrouded vertical axis dual-turbine generator, according to claim 1, wherein the shutters slide backwards, guided by tracks, to cover the portion of the turbines which is not sheltered by the cambers, protecting the turbines from potentially damaging currents of air or water and debris.

* * * * *